United States Patent
Terahata

(10) Patent No.: US 9,959,679 B2
(45) Date of Patent: May 1, 2018

(54) FLOATING GRAPHICAL USER INTERFACE

(71) Applicant: COLOPL, Inc., Tokyo (JP)

(72) Inventor: Shuhei Terahata, Tokyo (JP)

(73) Assignee: COLOPL, Inc., Tokyo (JP)

( * ) Notice: Subject to any disclaimer, the term of this patent is extended or adjusted under 35 U.S.C. 154(b) by 0 days. days.

(21) Appl. No.: 15/230,847

(22) Filed: Aug. 8, 2016

(65) Prior Publication Data
US 2016/0364916 A1 Dec. 15, 2016

Related U.S. Application Data

(63) Continuation of application No. PCT/JP2016/061872, filed on Apr. 13, 2016.

(30) Foreign Application Priority Data

Jun. 12, 2015 (JP) .................. 2015-119252

(51) Int. Cl.
| | | |
|---|---|---|
| G06T 19/00 | (2011.01) | |
| G06T 19/20 | (2011.01) | |
| G02B 27/01 | (2006.01) | |
| G06F 3/01 | (2006.01) | |
| G06F 3/0346 | (2013.01) | |
| G06F 3/0484 | (2013.01) | |

(52) U.S. Cl.
CPC .......... *G06T 19/006* (2013.01); *G02B 27/017* (2013.01); *G06F 3/013* (2013.01); *G06F 3/0346* (2013.01); *G06F 3/04842* (2013.01); *G06T 19/20* (2013.01); *G02B 2027/0123* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 2013/0117707 | A1* | 5/2013 | Wheeler | G06F 3/012 715/784 |
| 2014/0111427 | A1 | 4/2014 | Lindley et al. | |
| 2014/0118357 | A1* | 5/2014 | Covington | G06F 3/011 345/473 |
| 2014/0225920 | A1* | 8/2014 | Murata | G06F 3/012 345/633 |
| 2015/0123997 | A1* | 5/2015 | Hayasaka | G02B 27/017 345/633 |

(Continued)

FOREIGN PATENT DOCUMENTS

| | | |
|---|---|---|
| JP | H11-211480 A | 8/1999 |
| JP | 2008-033891 A | 2/2008 |

(Continued)

*Primary Examiner* — Vu Nguyen
(74) *Attorney, Agent, or Firm* — Metrolexis Law Group, PLLC

(57) ABSTRACT

A method of controlling a widget in a virtual space is disclosed, comprising: moving a field-of-view and a point of gaze in the virtual space; determining if the widget and the point of gaze overlap each other, and providing an input to the widget if the widget and the point of gaze overlap; determining if at least a part of the widget is positioned outside the field of view; and moving the widget so that the part of the widget is positioned inside the field of view if it is determined that at least a part of the widget is positioned outside the field of view.

15 Claims, 16 Drawing Sheets

(56) References Cited

U.S. PATENT DOCUMENTS

2016/0027215 A1* 1/2016 Burns ................ G02B 27/0172
                                                    345/419
2016/0027218 A1* 1/2016 Salter ................ G02B 27/0172
                                                    345/633

FOREIGN PATENT DOCUMENTS

| JP | 2011-128220 A | 6/2011 |
| JP | 2014-137616 A | 7/2014 |
| JP | 2015-032085 A | 2/2015 |
| JP | 2015-49498 A  | 3/2015 |
| JP | 2015-90635 A  | 5/2015 |

* cited by examiner

FLOATING GRAPHICAL USER INTERFACE

This application is a continuation application of International application Ser. NO. PCT/JP2016/061872, filed on Apr. 13, 2016, entitled "FLOATING GRAPHICAL USER INTERFACE", which claims the benefit of Japanese Patent Application Ser. No. 2015-119252, filed Jun. 12, 2015, the disclosure of which is incorporated by reference herein in its entirety.

BACKGROUND

The present disclosure relates to an apparatus, a method, a computer program, and a recording medium with the computer program recorded thereon for displaying an appropriate graphical user interface which is used by a user to perform operations in a virtual space, such as a virtual reality (VR) space or augmented reality (AR) space. The present disclosure is particularly suited for use with an immersive virtual space that employs a head mounted display (HMD) worn on the user's head.

BRIEF DESCRIPTION OF DRAWINGS

Aspects of the present disclosure can be understood from the following detailed description when read with the accompanying figures. It is noted that various features may or may not be drawn to scale. In particular, the dimensions of the various illustrated features may be arbitrarily increased or reduced for clarity of discussion.

DETAILED DESCRIPTION

Figure 1:
FIG. 1 is a diagram illustrating an example of a small-sized widget displayed as if floating according to embodiments of the present disclosure.

Various aspects of the present disclosure are directed to display widgets over a virtual space so as to reduce obstruction of the user's field of view. First, some embodiments of the present disclosure will be specifically shown in the form of a list. One or more embodiments discussed herein may include one or more of the following items. The operations performed in various embodiments improve the operation of a computer system in which embodiments may be implemented.

(Item 1)

An input method for performing input using a widget disposed in a virtual space, comprising: a point-of-gaze moving step in which a point of gaze is moved in the virtual space; a widget selection step in which it is determined whether the widget and the point of gaze overlap each other or not, and if they overlap, the widget is selected; and an input step in which input corresponding to the selected widget is performed.

According to the input method described in Item 1, the effective field of view available in a virtual space can be expanded. For example, using the input method described in Item 1 and a floating graphical user interface, i.e., a small-sized widget displayed as if floating over a virtual space, the field of view can be secured, and also the user does not have to perform a specific operation for input because the user can perform input using the common motion of moving the line of sight of the user in the virtual space. The effect is particularly significant when movement of the line of sight in a virtual space is carried out using attitude data for the main unit of a head mounted display (HMD).

(Item 2)

The input method according to Item 1, wherein the point-of-gaze moving step is a part of a field-of-view moving step in which the point of gaze is moved by moving a field of view relative to the virtual space.

(Item 3)

The input method according to Item 2, wherein, in the field-of-view moving step, the field of view is moved relative to the virtual space using measured motions of a user's head.

(Item 4)

The input method according to Item 2 or 3, further comprising: an initialization step in which the widget is placed at position $(X_{vs0}, Y_{vs0}, Z_{vs0})$ in the virtual space that corresponds to initial state position $(X_{fv0}, Y_{fv0})$ in the field of view, and a moving speed vector V of the widget in the virtual space is initialized to 0; a widget moving step in which the widget is moved at the moving speed vector V in the virtual space; a widget moving speed re-initialization step in which if the position of the widget in the field of view coincides with the initial state position in the field of view, the moving speed vector V is re-initialized to 0; a widget outside field-of-view determination step in which it is determined that the widget has become positioned outside the field of view; and a widget moving speed setting step in which when the widget is determined to be positioned outside the field of view in the widget outside field-of-view determination step, the moving speed vector V is given a value that makes the widget return to the initial state position in the field of view within the field of view in which the widget has been moved.

(Item 5)

The input method according to Item 4, wherein, in the widget moving speed re-initialization step, the position of the widget in the field of view is determined to coincide with the initial state position in the field of view when the position of the widget in the field of view in a horizontal direction (X direction) of the field of view coincides with the initial state position $X_{fv0}$ in the field of view; in the widget outside field-of-view determination step, the widget is determined to be positioned outside the field of view when the widget has become positioned outside the field of view in the horizontal direction (X direction); and in the widget moving speed setting step, giving the moving speed vector V a value that makes the widget return to the initial state position in the field of view within the field of view in which the widget has been moved includes giving the moving speed vector V a value that makes the widget move in the virtual space so as to return to the initial state position $X_{fv0}$ in the field of view only in the horizontal direction (X direction) of the field of view.

(Item 6)

The input method according to any one of Items 1 through 5, wherein, in the input step, input corresponding to the selected widget is performed when it is determined that the widget has been continuously gazed at for a predetermined time or longer.

(Item 7)

A program for carrying out the method according to any one of Items 1 through 6.

(Item 8)

A recording medium having recorded thereon a program for carrying out the method according to any one of Items 1 through 6. For example, a non-transitory computer-readable storage medium may carry one or more sequences of one or more instructions which, when executed by one or more processors, cause an apparatus to perform operations corresponding to the method of any one or more of Items 1 through 6.

(Item 9)

An input apparatus for performing input using a widget disposed in a virtual space, comprising: a point-of-gaze moving unit which moves a point of gaze in the virtual space; a widget selecting unit which determines whether the widget and the point of gaze overlap each other or not, and if they overlap, selects the widget; and an input unit which performs input corresponding to the selected widget.

According to the input apparatus described in Item 9, the effective field of view available in a virtual space can be expanded. For example, using the input apparatus described in Item 9 and a floating graphical user interface, i.e., a small-sized widget displayed as if floating over a virtual space, the field of view can be secured, and also the user does not need to perform a specific operation for input because the user can perform input using the common motion of moving the line of sight of the user in the virtual space. The effect is significant especially when movement of the line of sight in a virtual space is carried out using attitude data for the main unit of a head mounted display (HMD).

(Item 10)

The input apparatus according to Item 9, wherein the point-of-gaze moving unit is a part of a field-of-view moving unit which moves the point of gaze by moving a field of view relative to the virtual space.

(Item 11)

The input apparatus according to Item 10, wherein the field-of-view moving unit moves the field of view relative to the virtual space using measured motions of a user's head.

(Item 12)

The input apparatus according to Item 10 or 11, further comprising: an initialization unit which places the widget at position $(X_{vs0}, Y_{vs0}, Z_{vs0})$ in the virtual space that corresponds to initial state position $(X_{fv0}, Y_{fv0})$ in the field of view, and initializes a moving speed vector V of the widget in the virtual space to 0; a widget moving unit which moves the widget at the moving speed vector V in the virtual space; a widget moving speed re-initialization unit which, if the position of the widget in the field of view coincides with the initial state position in the field of view, re-initializes the moving speed vector V to 0; a widget outside field-of-view determination unit which determines that the widget has become positioned outside the field of view; and a widget moving speed setting unit which, when the widget outside field-of-view determination unit determines that the widget is positioned outside the field of view, gives the moving speed vector V a value that makes the widget return to the initial state position in the field of view within the field of view in which the widget has been moved.

(Item 13)

The input apparatus according to Item 12, wherein the widget moving speed re-initialization unit determines that the position of the widget in the field of view coincides with the initial state position in the field of view when the position of the widget in the field of view in a horizontal direction (X direction) of the field of view coincides with the initial state position $X_{fv0}$ in the field of view; the widget outside field-of-view determination unit determines that the widget is positioned outside the field of view when the widget has become positioned outside the field of view in the horizontal direction (X direction); and the widget moving speed setting unit giving the moving speed vector V a value that makes the widget return to the initial state position in the field of view within the field of view in which the widget has been moved includes giving the moving speed vector V a value that makes the widget move in the virtual space so as to return to the initial state position $X_{fv0}$ in the field of view only in the horizontal direction (X direction) of the field of view.

(Item 14)

MA The input apparatus according to any one of Items 9 through 13, wherein the input unit performs input corresponding to the selected widget when it is determined that the widget has been continuously gazed at for a predetermined time or longer.

Some embodiments of the present disclosure will be described below with reference to the attached drawings. Some embodiments use a head mounted display (HMD) containing various kinds of sensors (e.g., an acceleration sensor, an angular velocity sensor) and capable of measuring attitude data. Some embodiments of the present disclosure are described in the context of an immersive virtual space that uses such attitude data to scroll an image displayed on the head mounted display (HMD) to enable movement of the line of sight in the virtual space. The present disclosure however is also applicable to displaying a virtual space on a common display and moving the line of sight in the virtual space by use of an input device such as a keyboard, a mouse, or a joystick.

In the figures, the same components are denoted with the same reference numerals.

Figure 2:
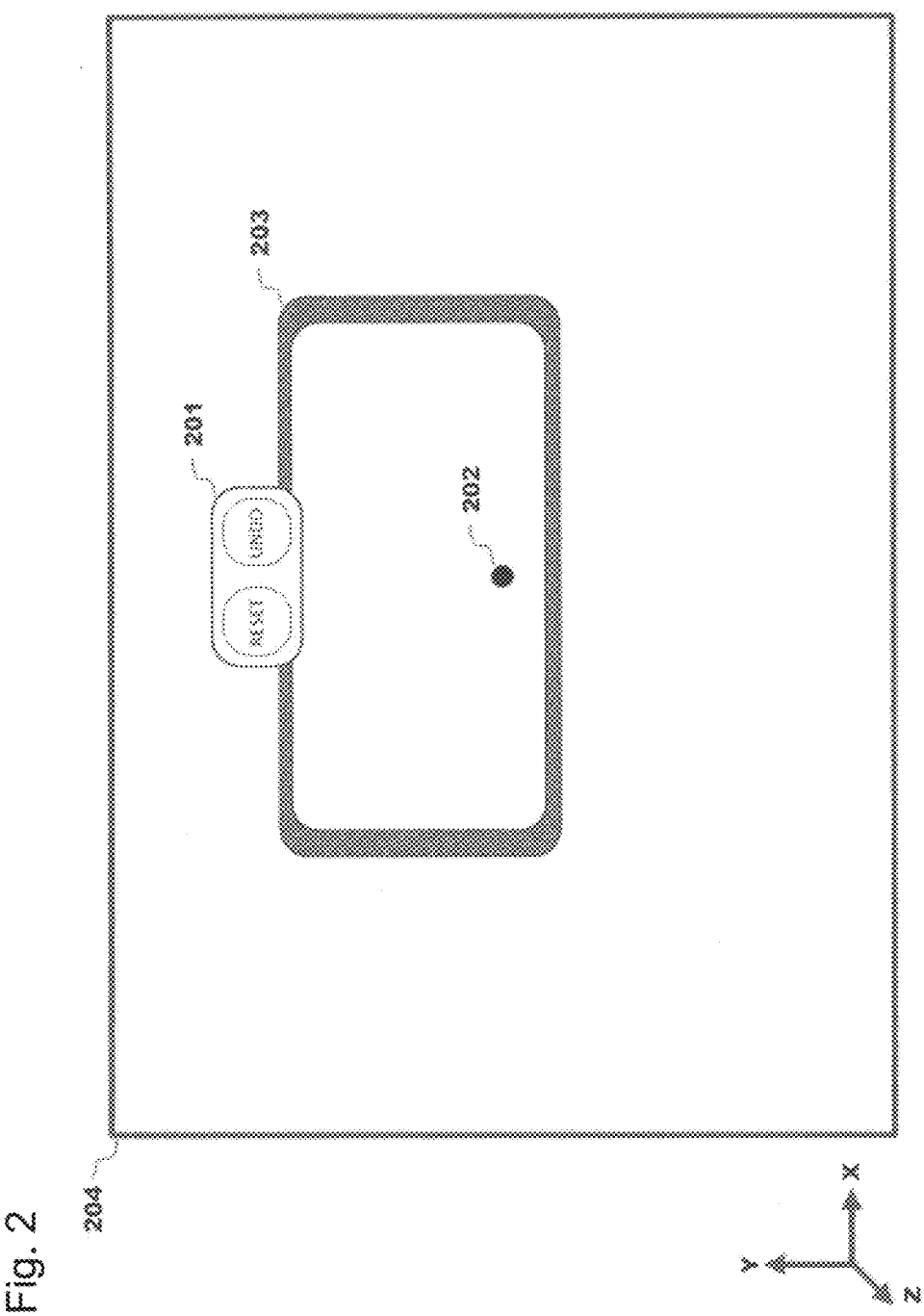
FIG. 2 is a diagram illustrating exemplary positions of a widget 201 and a cursor 202 in an initial state.

FIG. 1 shows an example of a small-sized widget that is displayed as if floating according to some embodiments of the present disclosure. FIG. 2 is an illustration for describing the elements displayed in FIG. 1 and also showing the exemplary positions of a widget 201 and a cursor 202 in the initial state.

The widget 201 is displayed as if it is floating over a virtual space.

In FIG. 1, the widget 201 is in the form of an unmanned aircraft (e.g. a drone) from which buttons are suspended. However, the widget may be of any design that looks natural when floating in the virtual space of interest, such as a UFO, a robot, an insect, a bird, a fairy, or a ghost.

In FIG. 1, the widget 201 has two buttons as the targets of operation. However, the number of buttons or the like as targets of operation is not limited to two; the number may be determined in accordance with the size or definition of the screen, the size of the portion of the field of view that is obstructed by the widget 201, and/or the types of operations required. Further, it is not even necessary to display buttons and the like as targets of operation at all times; buttons and the like as targets of operation may be expanded and displayed in response to detecting that the widget 201 has been once selected, as with dropdown lists, popup menus or context menus used in common graphical user interfaces.

The cursor 202 indicates the location in the virtual space that is being gazed at by the user, namely the point of gaze.

Many of the head mounted displays (HMDs) that are capable of measuring attitude data obtain the attitude data by detecting the motion of the head of the user wearing the head mounted display (HMD). In such a case, control is typically carried out so that the field of view in the virtual space is moved using the attitude data, while the point of gaze itself is fixed in the center of the field of view, i.e., in the center of the screen. In such an implementation, no sense of unnaturalness occurs in terms of operation if display of the cursor 202 is omitted.

Since the point of gaze is a point used for performing operations on the widget 201, the point of gaze may not be present in the center of the field of view, that is, in the center of the screen, but may be located at a position displaced from the center of the field of view instead. In that case, operation would be easier with the cursor 202 displayed. Operation is also easier with the cursor 202 displayed when it is possible to move the point of gaze independently from movement of the field of view such as by detecting the movement of the eyeballs or using some kind of auxiliary input.

Considering that the cursor 202 obstructs the field of view, the cursor 202 may be displayed when the widget 201 and the point of gaze indicated by the cursor 202 have come into the vicinity of each other even in the case in which the cursor 202 is displayed.

A window 203 is a window present at a fixed position in the virtual space and is illustrated for the sake of convenience for showing the relative positional relationship between the virtual space and the field of view 204. Also, as shown in FIG. 2, the horizontal direction in the field of view 204 will be referred to as the X direction, the vertical direction as the Y direction, and the depth direction as the Z direction.

In the following description, motion of the widget 201 over the virtual space will be described with reference to FIGS. 2 through 9. While the description below assumes that the point of gaze is fixed in the center of the field of view and the cursor 202 is also displayed being fixed in the center of the screen, the description also applies to a case in which the point of gaze is located at a position displaced from the center of the field of view, a case in which the point of gaze can be moved with the field of view fixed, or a case in which display of the cursor 202 is omitted or the cursor 202 is only displayed when it has come into the vicinity of the widget 201. Therefore, in a case in which the cursor 202 is not displayed, the cursor 202 should be interpreted as the point of gaze instead.

As previously mentioned, FIG. 2 shows exemplary positions of the widget 201 and the cursor 202 in the initial state.

In the example shown in FIG. 2, in its initial state, the widget 201 is positioned almost in the center of the field of view in the horizontal direction (X direction), while in the vertical direction (Y direction), it is positioned above the center of the field of view. This position in the initial state is defined as $(X_{fv0}, Y_{fv0})$ on the coordinate axes corresponding to the field of view, and the position in the virtual space is defined as $(X_{vs0}, Y_{vs0}, Z_{vs0})$ on the coordinate axes in the virtual space.

The position in the field of view at which the widget 201 is displayed in the initial state is not limited to this position. In order to avoid obstructing a significant portion of the field of view with the widget 201, in some embodiments the widget 201 can be displayed away from the center of the field of view. The widget 201 may be displayed in a corner of the field of view without causing any inconvenience. However, since operation on the widget 201 is carried out by moving the field of view to move the widget 201 to the position of the cursor 202, i.e., the center of the field of view, making them overlap as shown below, a longer time is required for the operation as the widget 201 is positioned farther from the center of the field of view.

Figure 3:
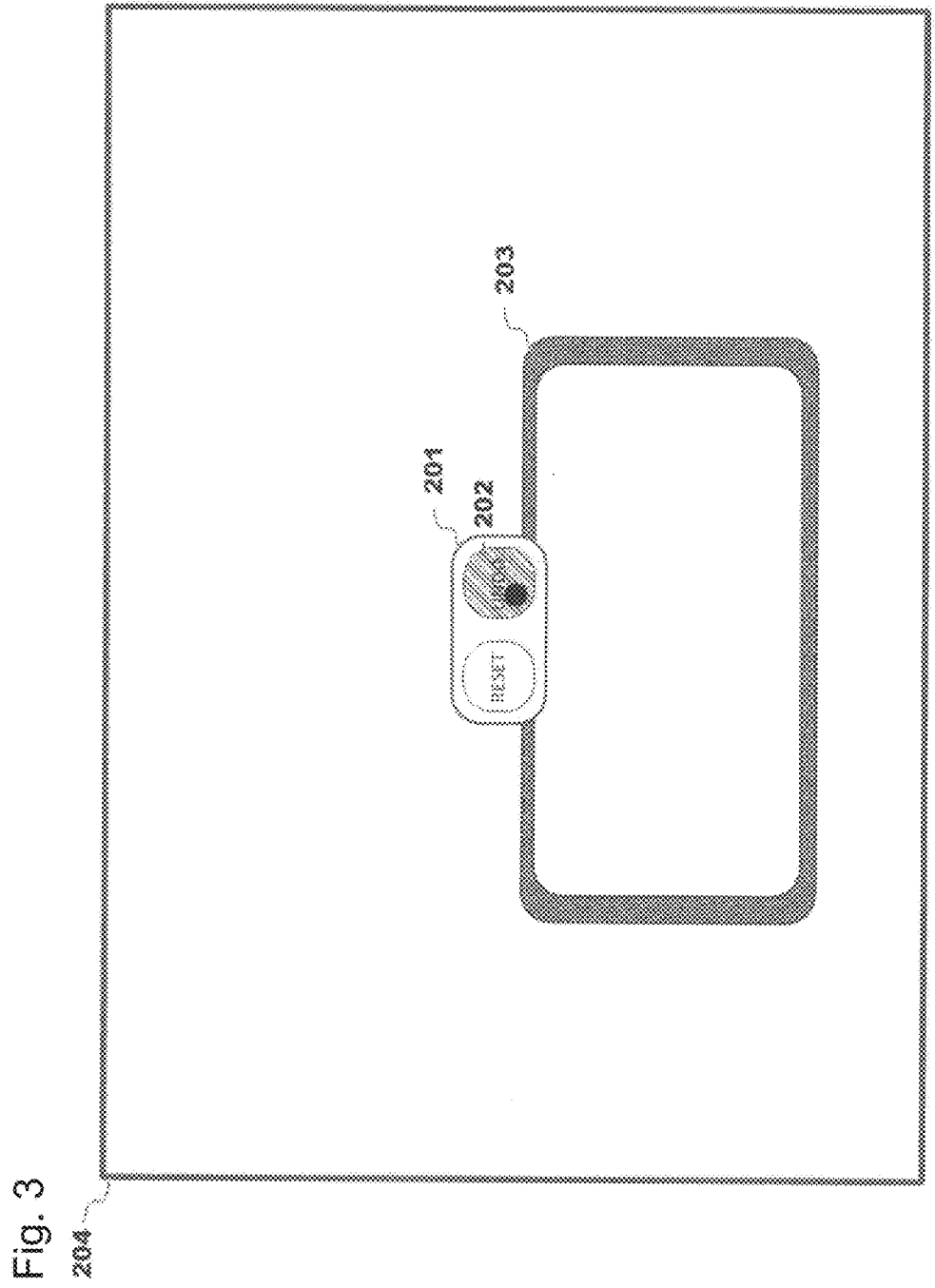
FIG. 3 is a diagram illustrating a state in which the field of view has been moved upward (+Y direction) and slightly to the right (+X direction) from the initial state illustrated in FIG. 2.

FIG. 3 illustrates a state in which the field of view has been moved upward by ΔY (+Y direction) and slightly to the right by ΔX (+X direction) from the state in FIG. 2. The widget 201 may basically be floating at a fixed position relative to the virtual space. While in FIG. 3 the widget 201 stays at $(X_{vs0}, Y_{vs0}, Z_{vs0})$ on the coordinate axes in the virtual space, the widget 201 can be moved to $(X_{fv0}-\Delta X, Y_{fv0}-\Delta Y)$ on the coordinate axes corresponding to the field of view, thus slightly to the left of the center of the field of view by moving the field of view upward (+Y direction) and slightly to the right (+X direction). Since the window 203 does not move within the virtual space, it can be seen from comparison of FIG. 2 and FIG. 3 that the positional relationship between the widget 201 and the window 203 has not changed.

The display illustrated in FIG. 3 has changed in order to indicate that at this point the cursor 202 actually overlaps the right button of the widget 201 and that button has been selected. In order to perform an operation corresponding to the right button of the widget 201, it is necessary to confirm the selection. According to this example, the selection is confirmed by fixing the field of view and keeping the cursor 202 displayed over the right button of the widget 201 for a predetermined time or longer. In some embodiments, however, different methods may be employed such as using an auxiliary input device based on a keyboard and the like or providing a button for confirming a selection on the widget 201.

FIG. 3 shows that the right button of the widget 201 is selected by the cursor 202 overlapping the button. However, a mechanism may be used that detects that the widget 201 has been selected and expands and displays buttons or the like as the targets of operation in a similar manner to a dropdown list, a popup menu, or a context menu used in common graphical user interfaces.

In addition, as described below, considering that the widget 201 moves in the virtual space, determination of whether the widget 201 has been selected may be based not only on a condition in which the widget 201 and the cursor 202 overlap each other but a condition in which the speed of movement of the widget 201 in the virtual space is zero.

Referring now to FIGS. 4 to 7, how the widget 201 is displayed when the field of view is moved in the horizontal direction (X direction) will be described.

Figure 4:
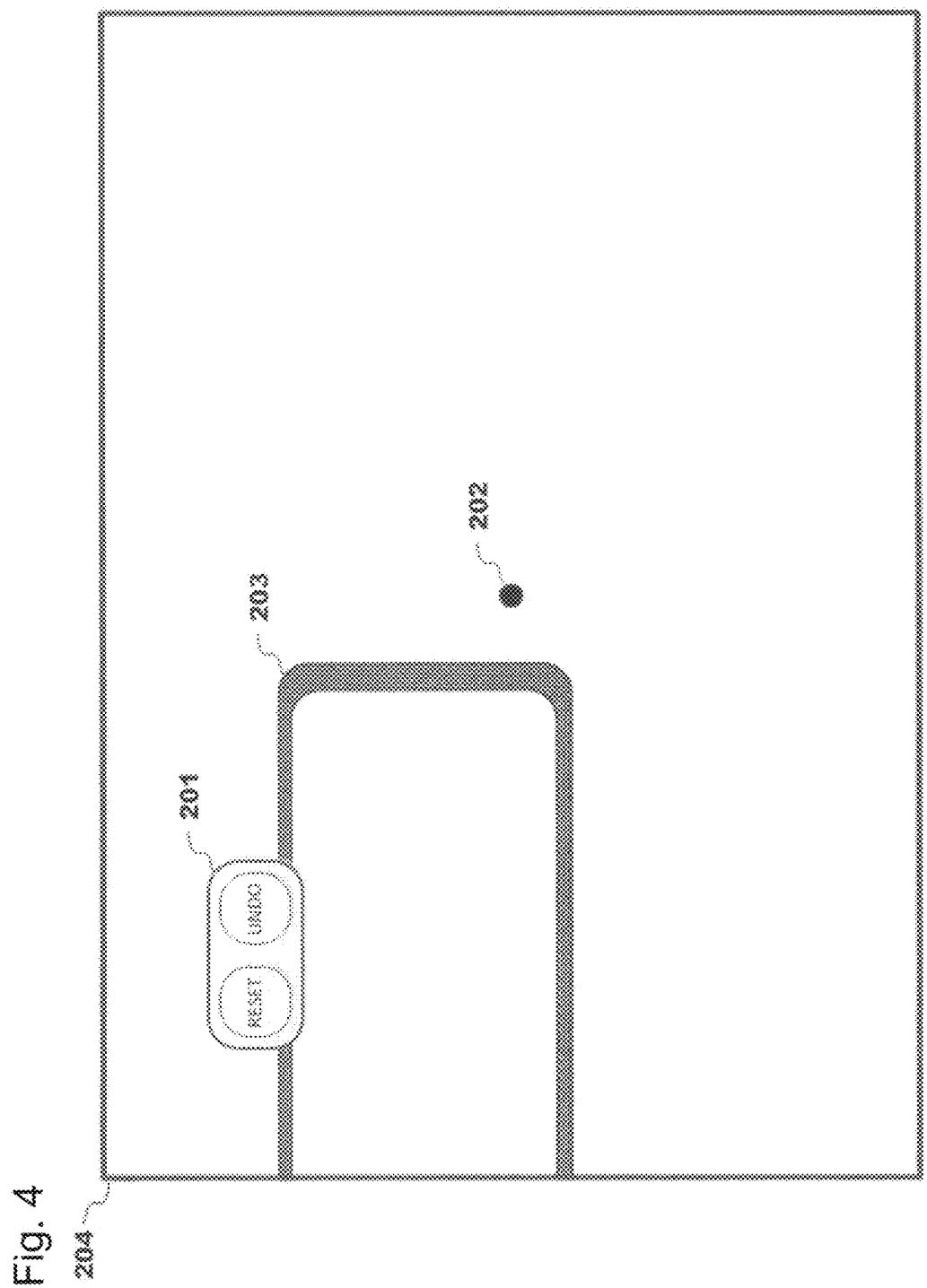
FIG. 4 is a diagram illustrating a state in which the field of view has been moved to the right (+X direction) from the state illustrated in FIG. 2.

FIG. 4 illustrates a state in which the field of view has been moved to the right (+X direction) from the state in FIG. 2, resulting in the widget 201 moving to the left (−X direction) in the field of view. As previously mentioned, since the widget 201 is basically floating at a fixed position relative to the virtual space, it can be seen from comparison of FIG. 2 and FIG. 4 that the relative positional relationship between the widget 201 and the window 203 has not changed.

Figure 5:
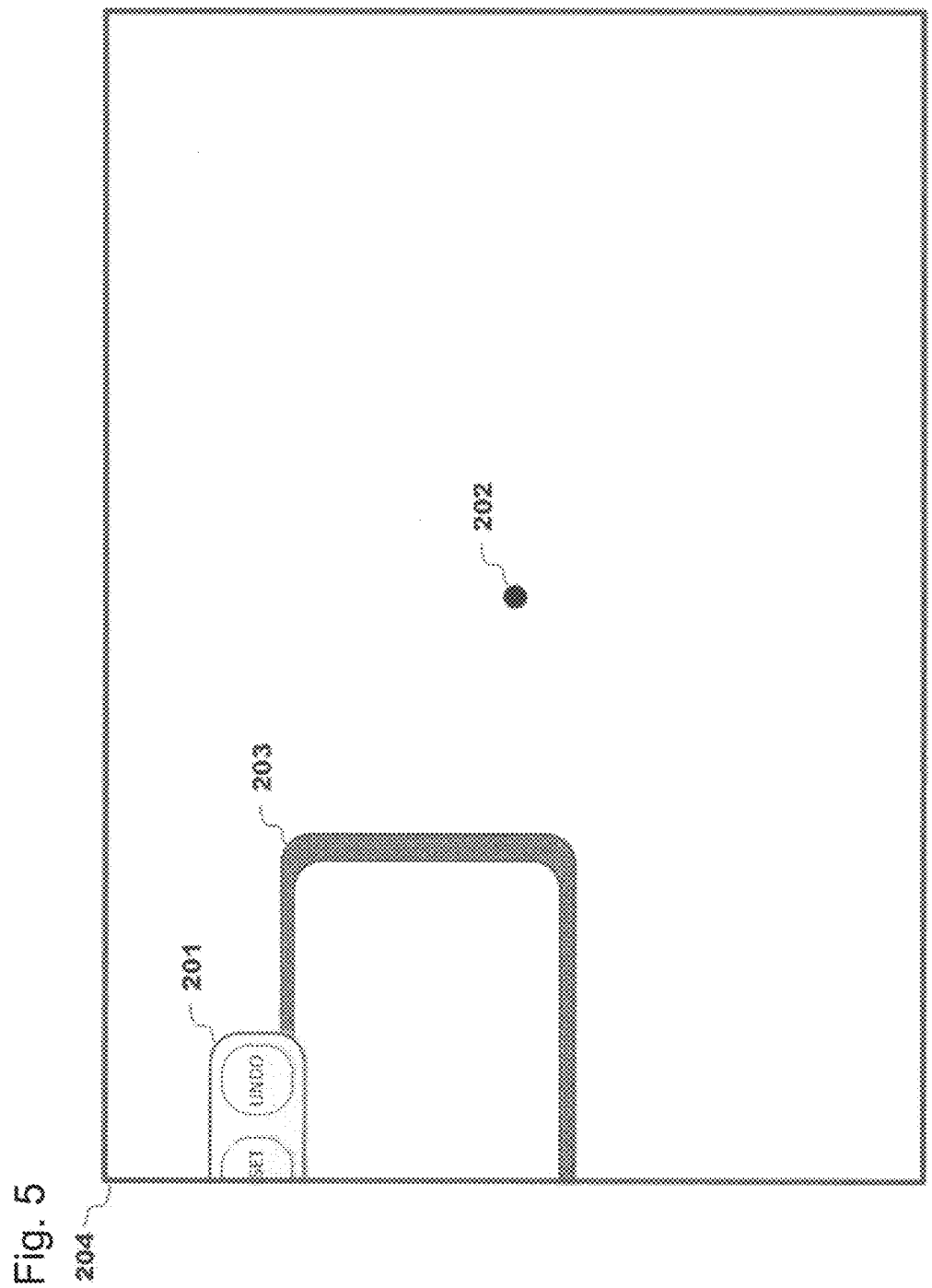
FIG. 5 is a diagram illustrating a state in which the field of view has been moved further to the right (+X direction) from the state illustrated in FIG. 4.

FIG. 5 illustrates a state in which the field of view has been moved further to the right (+X direction) from FIG. 4. At this point, the widget 201 has moved further to the left (−X direction) such that a portion thereof is positioned outside the field of view. Until this point, the widget 201 has been floating at a fixed position relative to the virtual space, but once the widget 201 is positioned outside the field of view in the horizontal direction (X direction), the widget 201 starts to move in the virtual space so as to return to the initial state position in the field of view. The condition for determining that the widget 201 is positioned outside the field of view may be that any part of the widget 201 is positioned outside the field of view, that half of the widget 201 is positioned outside the field of view, or that the entire widget 201 is positioned outside the field of view, for example.

The initial state position in the field of view to which the widget 201 returns at this point is specifically the initial state position $X_{fv0}$ in the horizontal direction (X direction) within the field of view. Even if the position of the widget 201 at this point is different from the initial state position also in the vertical direction (Y direction) within the field of view, the widget 201 may move in the virtual space so as to return to the initial state position $X_{fv0}$ in the horizontal direction (X direction) within the field of view while maintaining the difference in the vertical direction (Y direction).

In order to make the widget 201 appear to be actually floating in the virtual space, in some embodiments, movement in the virtual space for returning to the initial state position in the field of view may take place at a predetermined speed Vx. The manner of following may be varied when the movement of the field of view is slow and when it is fast, although it may be instantaneous movement instead.

Figure 6:
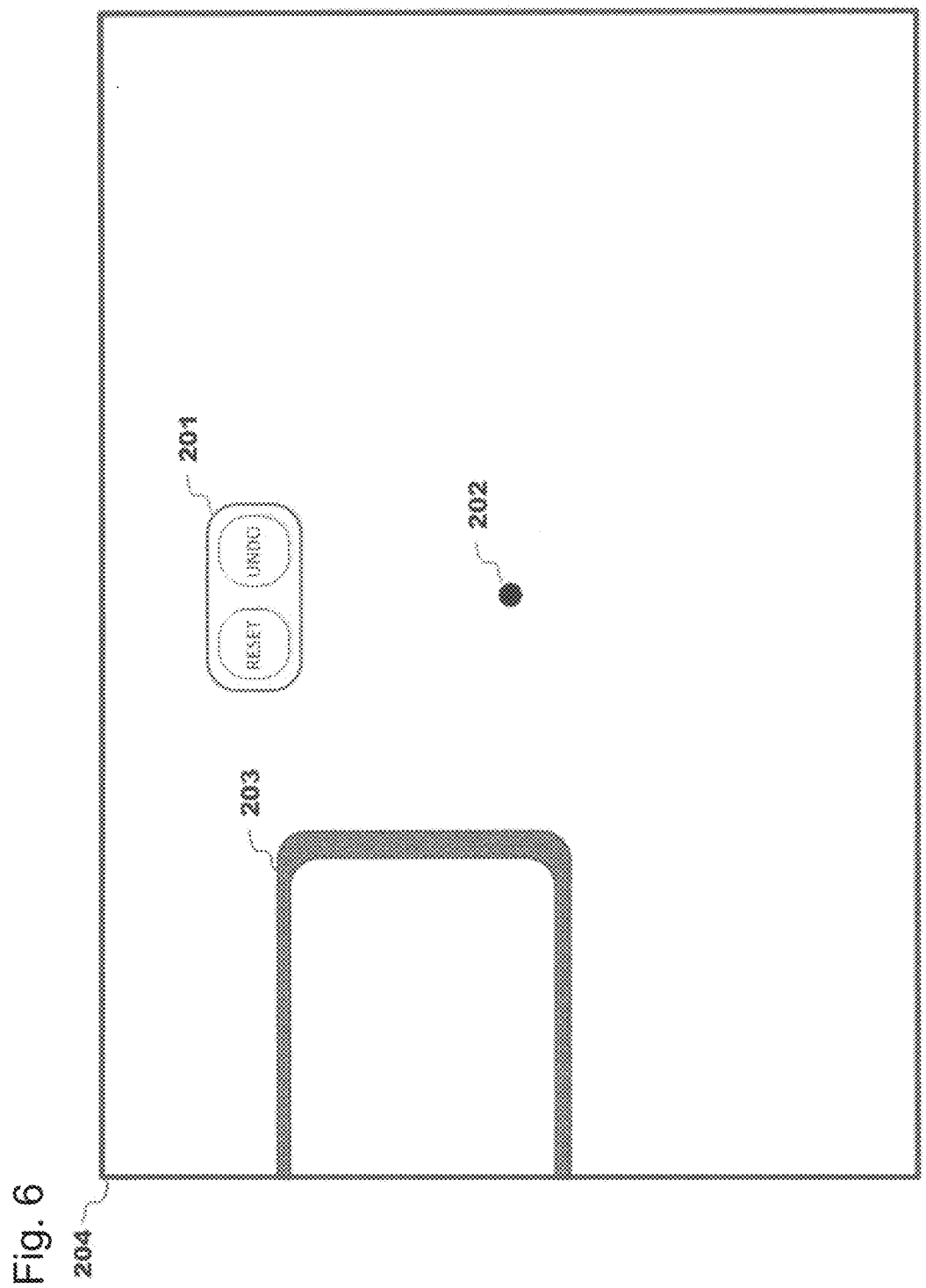
FIG. 6 is a diagram illustrating a state in which the widget 201 has returned to its initial state position in the field of view after the state illustrated in FIG. 5.

FIG. 6 illustrates the widget 201 after returning to the initial state position in the field of view, that is, the initial state position $X_{fv0}$ in the field of view in the horizontal direction (X direction) in this example. As the widget 201 has moved in the virtual space, at this point it is located at a position different from $(X_{vs0}, Y_{vs0}, Z_{vs0})$, namely the initial state position on the coordinate axes in the virtual space. Comparison of the positional relationship between the widget 201 and the window 203 in FIG. 2 with that in FIG. 6 shows that the positional relationship between the widget 201 and the virtual space has changed at the point of FIG. 6.

Referring now to FIGS. 7 to 10, how the widget 201 is displayed when the field of view is moved vertically (in Y direction) will be described.

Figure 7:
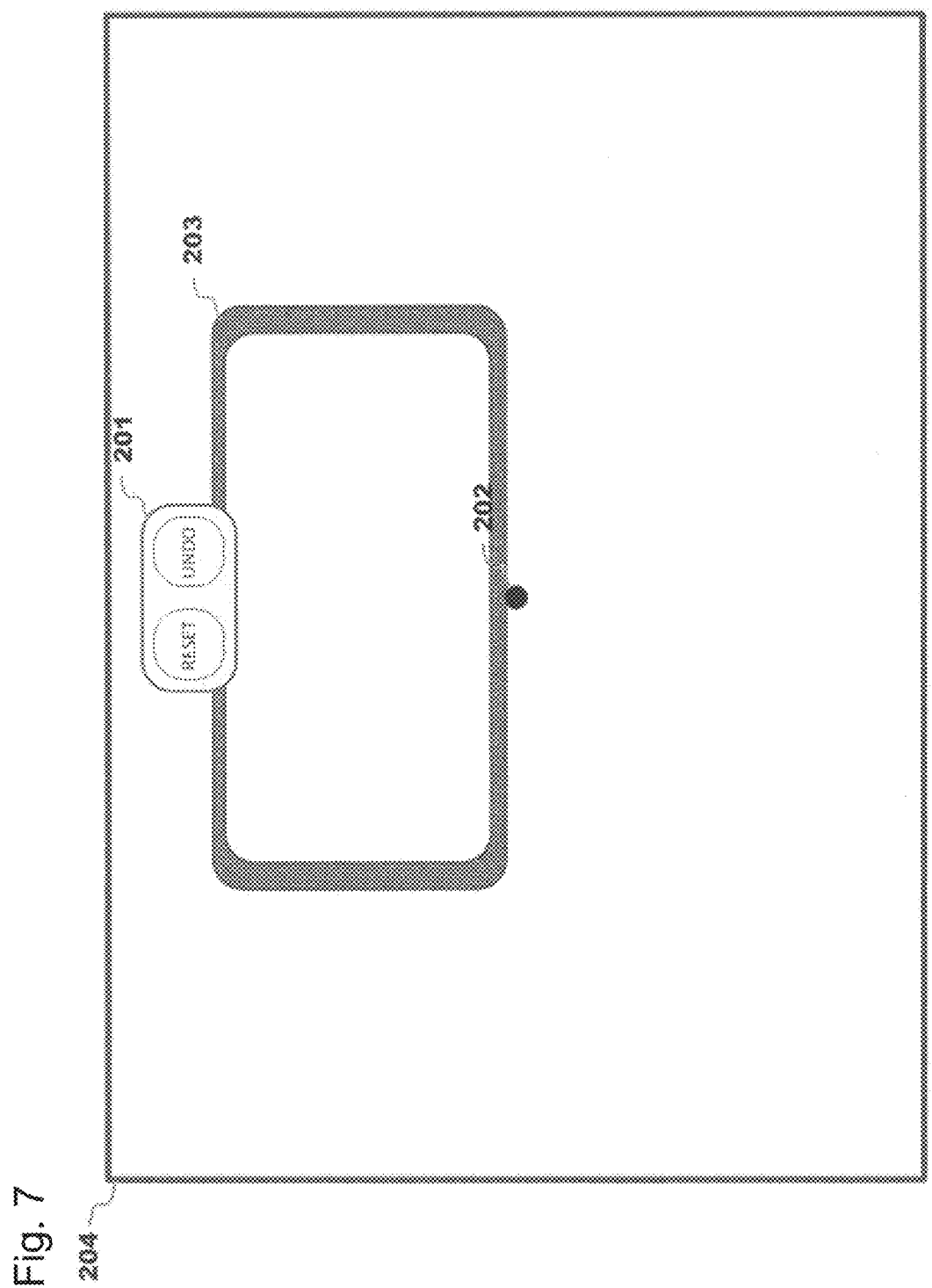
FIG. 7 is a diagram illustrating a state in which the field of view has been moved downward (−Y direction) from the state illustrated in FIG. 2.

FIG. 7 illustrates a state in which the field of view has been moved downward (−Y direction) from the state in FIG. 2, resulting in the widget 201 moving upward (+Y direction) in the field of view. As in FIG. 4, comparison of FIG. 2 and FIG. 7 shows that the relative positional relationship between the widget 201 and the window 203 has not changed.

Figure 8:
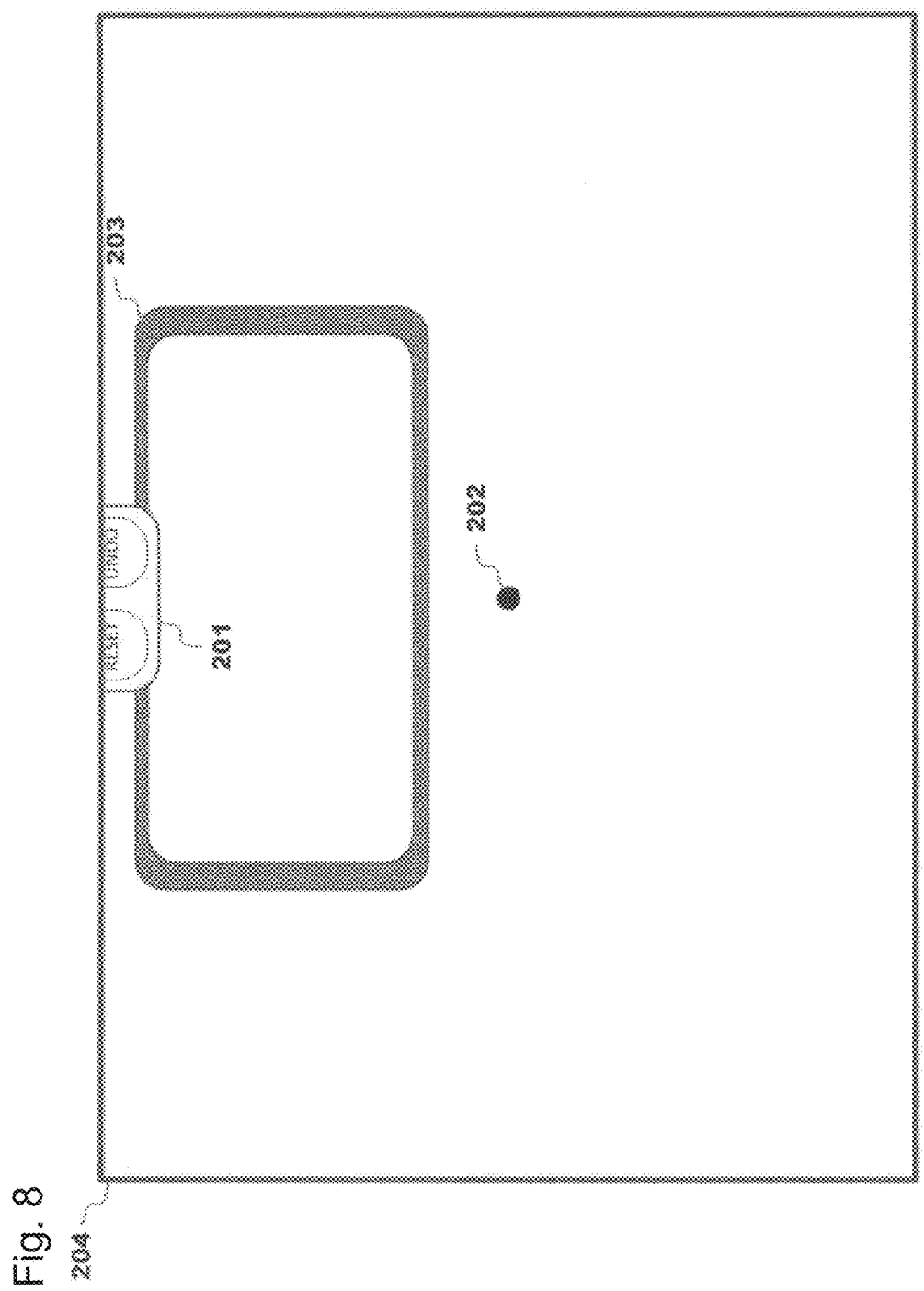
FIG. 8 is a diagram illustrating a state in which the field of view has been moved further downward (−Y direction) from the state illustrated in FIG. 7.

FIG. 8 illustrates a state in which the field of view has been moved further downward (−Y direction) from FIG. 7. At this point, part of the widget 201 is positioned outside the field of view. When the widget 201 is positioned outside the field of view in the horizontal direction (X direction) as shown in FIG. 5, the widget 201 starts to move in the virtual space so as to return to the initial state position in the field of view; in this embodiment, however, such movement does not take place in the case of the vertical direction (Y direction).

Figure 9:
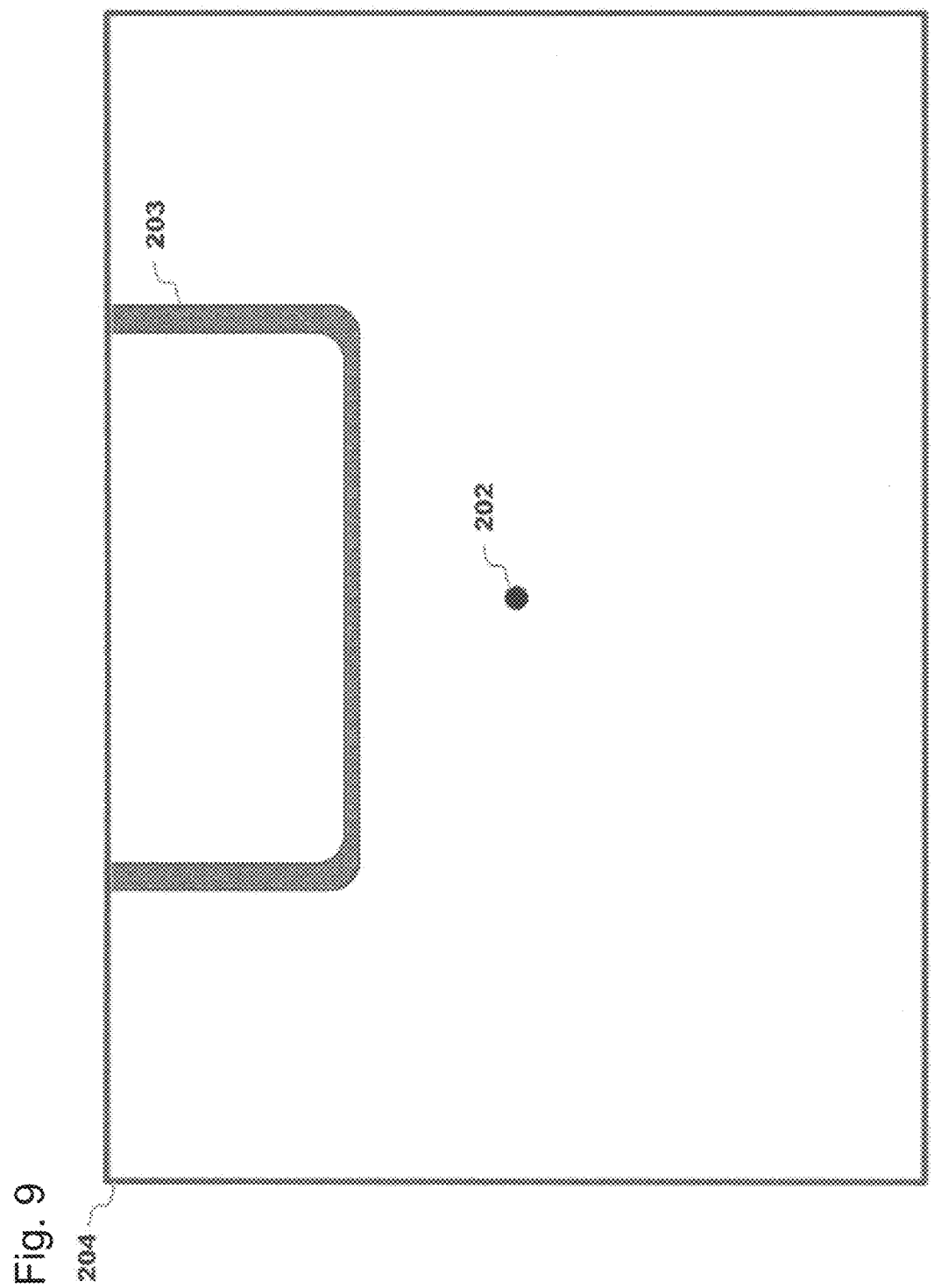
FIG. 9 is a diagram illustrating a state in which the widget 201 is positioned entirely outside the field of view and is not visible as a result of moving the field of view further downward (−Y direction) from the state illustrated FIG. 8.

FIG. 9 illustrates that the widget 201 is positioned entirely outside the field of view and is not visible as a result of moving the field of view further downward (−Y direction) from FIG. 8.

For the reason described below, different processing is performed when the widget 201 is positioned outside the field of view in the case of moving the field of view in the horizontal direction (X direction) shown in FIGS. 4 to 7 and in the case of moving the field of view in the vertical direction (Y direction) shown in FIGS. 7 to 10.

Figure 14:
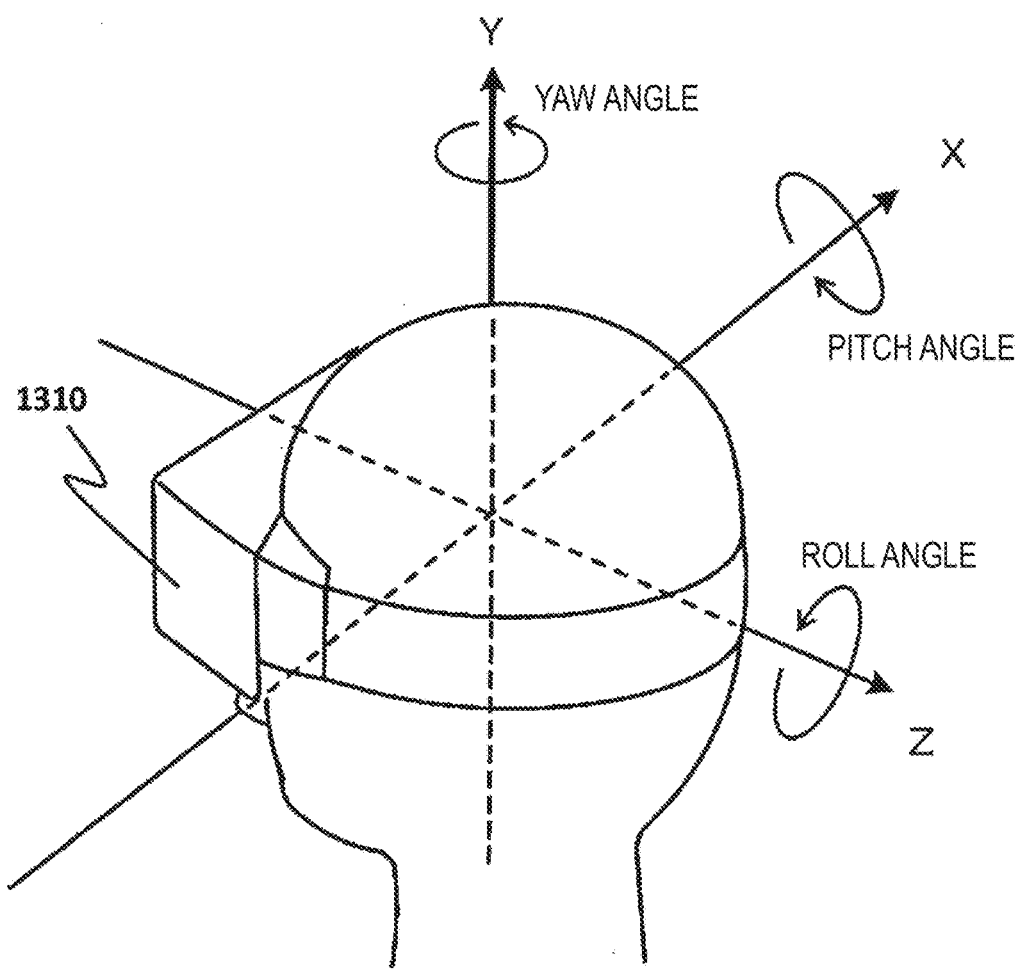
FIG. 14 is a diagram illustrating angle information data that can be detected by a tilt sensor of a head mounted display (HMD) 1310.

Motions that cause a person's field of view to move in the horizontal direction (X direction), that is, movement of the yaw angle that rotates about the Y-axis in FIG. 14 include the motion of turning the head to the right or left as well as the motion of turning the entire body to the right or left. After moving his/her field of view in the horizontal direction (X direction) such as by turning the entire body to the right or left, a person can make the motion of further facing to the right or left about the new orientation. In contrast, a motion that causes the field of view to move in the vertical direction (Y direction), that is, movement of the pitch angle that rotates about the X-axis in FIG. 14, is limited to the motion of moving the head up and down alone. It is difficult for a person to keep the new position for a long time or move his/her field of view further in the vertical direction (Y direction) about the new position, and the motion itself is only transient. That is to say, because human motions differ when moving his/her field of view in the vertical direction (Y direction) and when moving a field of view in the horizontal direction (X direction), it is more natural to vary the way the widget 201 moves when the field of view is moved in the vertical direction (Y direction) and when it is moved in the horizontal direction (X direction).

Accordingly, if the virtual space being displayed is a weightless space, for example, and motions such as rotating the entire body forward or backward are permitted, such as the movement of the pitch angle that rotates about the X-axis shown in FIG. 14, it is more natural, despite the description in FIGS. 7 to 10, to return the widget 201 to the initial state position in the field of view. This may be true as in the case of moving the field of view in the horizontal direction (X direction) described in FIGS. 4 to 7 also when the field of view is moved in the vertical direction (Y direction) and the widget 201 is positioned outside the field of view.

In addition to movements in the horizontal (X direction) and vertical (Y direction) directions as described above, movements of the field of view in the virtual space include movements in the direction of line of sight, i.e., the movement of the roll angle that rotates about the depth direction (Z direction) illustrated in FIG. 14.

This movement of the roll angle rotating about the depth direction (Z direction) is actually the motion of tilting the head to the right or left. This tilting motion has limitations similar to the pitch angle movement which moves the field of view in the vertical direction (Y direction) by moving the head up and down, and the motion itself is only transient. Thus, as with the movement of the field of view in the vertical direction (Y direction), it is not necessary to move the widget 201 in the virtual space even when the widget 201 is positioned outside the field of view as a result of a roll angle movement which is rotation about the Z-axis.

In contrast, in a case in which the virtual space being displayed is a weightless space, for example, and the motion of rotating the entire body sideways is permitted as the movement of the roll angle that rotates about the depth direction (Z direction) as discussed above in relation to the field of view movement in the vertical direction (Y direction), the widget 201 may be moved in the virtual space in conformance to the motion of the user so that the position of the user in the virtual space and the position of the widget 201 in the direction in which it rotates about the Z-axis are maintained relative to each other. Since such moving of the widget 201 in the virtual space is virtually equivalent to fixedly displaying the widget 201 in the field of view, the widget 201 will not be positioned outside the field of view as a result of such movement except for a transient case. As such there is no need to make a determination and implement special processing for the transient case.

Although movement of the field of view has been so far described as being caused by movements of the yaw angle, pitch angle, and roll angle defined in FIG. 14, for easier understanding, a case in which the user moves around in the virtual space should be considered because both the user and the widget 201 are present in the virtual space.

First, consider movement in the Z-axis direction as defined in FIGS. 2 and 14 among cases of the user moving around in the virtual space.

Considering that the widget 201 is a target of operation, in some embodiments, the apparent size of the widget 201 can be constant. In order to achieve this constant apparent size, the widget 201 can be present on a virtual sphere 1001 which is defined around the user in the virtual space as shown in FIG. 10 so that a distance between the user and the widget 201 in the virtual space is maintained.

Figure 10:
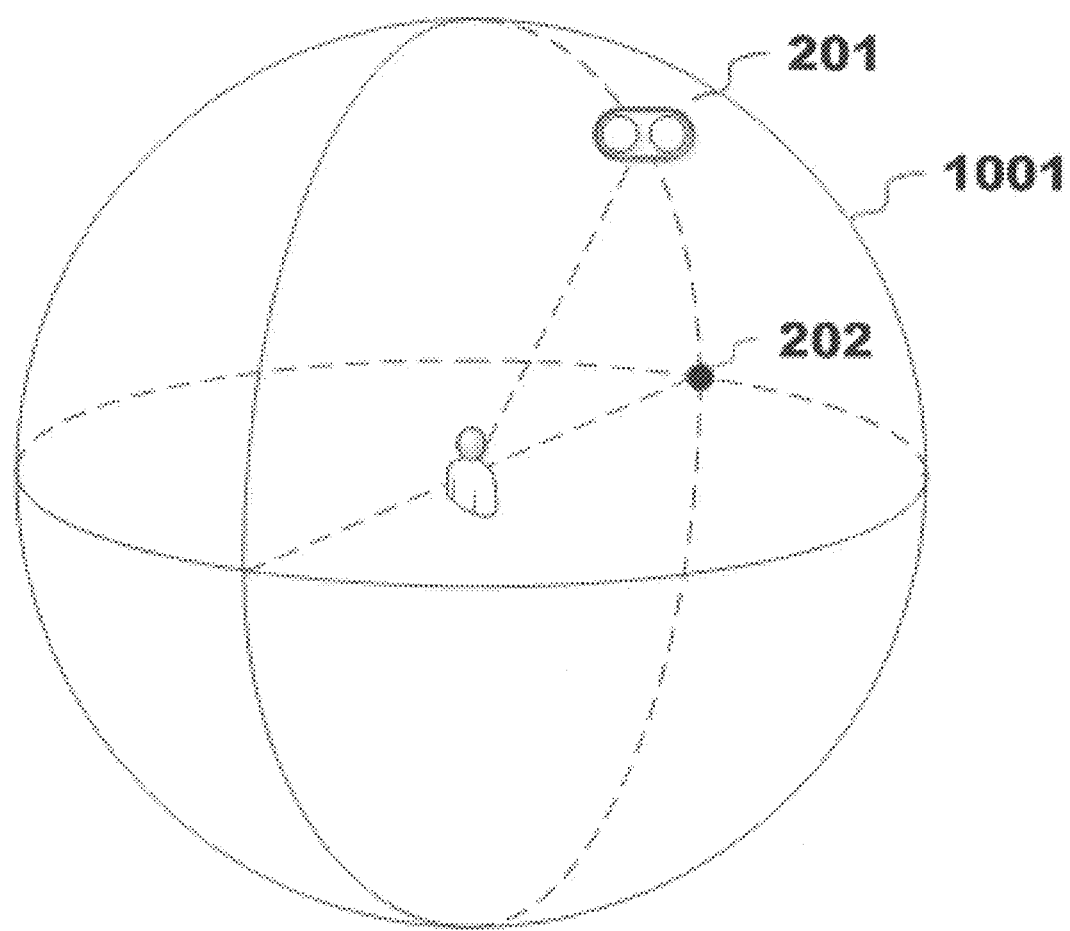
FIG. 10 is a diagram illustrating a virtual sphere 1001 defined around the user.

For simplicity, the following description assumes that the widget 201, the cursor 202, and the user are in the positional relationship illustrated in FIG. 10. In this relationship, the user's field of view looks like the one shown in FIG. 2.

When the user moves in the virtual space in the Z-axis direction connecting between the user and the cursor 202, the virtual sphere 1001 also moves in the Z-axis direction connecting between the user and the cursor 202. Thus, in order to maintain the presence of the widget 201 on the virtual sphere 1001, in some embodiments the widget 201 can move following the user's movement in the Z-axis direction. Again, in order to make the widget 201 appear to be actually floating in the virtual space, in some embodiments the movement can take place at a predetermined speed and the manner of following be varied when the user's movement is slow and when it is fast, although it may be instantaneous movement instead.

Since repetition of small movements of the widget 201 is visually distracting, the following may occur only after the user's movement in the Z-axis direction has reached a certain amount, or if any movement of the user that has not been followed remains, it may be done together when the widget 201 needs to be moved at a later time.

Such movement of the widget 201 in the virtual space means displaying the widget 201 substantially fixedly in the field of view. Therefore, the widget 201 will not be positioned outside the field of view as a result of such movement except for the case in which the movement of the field of view in the Z-axis direction that approaches the widget 201 is so fast that movement of the widget 201 in the virtual space cannot keep up with the field of view movement and the widget 201 transiently goes out of the field of view. Even in such a transient case, the widget 201 will return into the field of view when the movement of the field of view stops, so there is no need to determine whether the widget 201 is located inside or outside the field of view and to perform special processing.

Next, consider a case in which the user moves in the X-axis and Y-axis directions which are defined in FIGS. 2 and 14. In this case, assuming that the widget 201 is present on the virtual sphere 1001 around the user as illustrated in FIG. 10, the virtual sphere 1001 itself moves also when the user himself/herself moves in the horizontal direction (X direction) and the vertical direction (Y direction), resulting in the widget 201 going off the virtual sphere 1001.

As previously described above, when the widget 201 has moved outside the field of view as a result of the field of view moving in the horizontal direction (X direction), the widget 201 makes a movement to return to the initial state position in the field of view. If the field of view moves in the horizontal direction (X direction) and the vertical direction (Y direction) as a result of the user himself/herself moving in the X-axis direction and Y-axis direction, it is necessary to determine a straight line connecting between the widget 201 and the new position to which the user has moved in addition to the movement of the widget 201 described above, and move the widget 201 to the virtual space position at which the straight line intersects with the virtual sphere 1001 after the movement.

Again, in some embodiments movement can take place at a predetermined speed in order to make the widget 201 appear to be actually floating in the virtual space and the manner of following be varied when the user's movement is slow and when it is fast, although it may be instantaneous movement instead.

As with the user's movement in the Z-axis direction, the following may also occur in this case after the user's movement has reached a certain amount because repetition of small movements of the widget 201 is visually distracting. Or, if any movement of the user that has not been followed remains, following of any unfollowed movement may be done together when the widget 201 needs to be moved at a later time.

Figure 11:
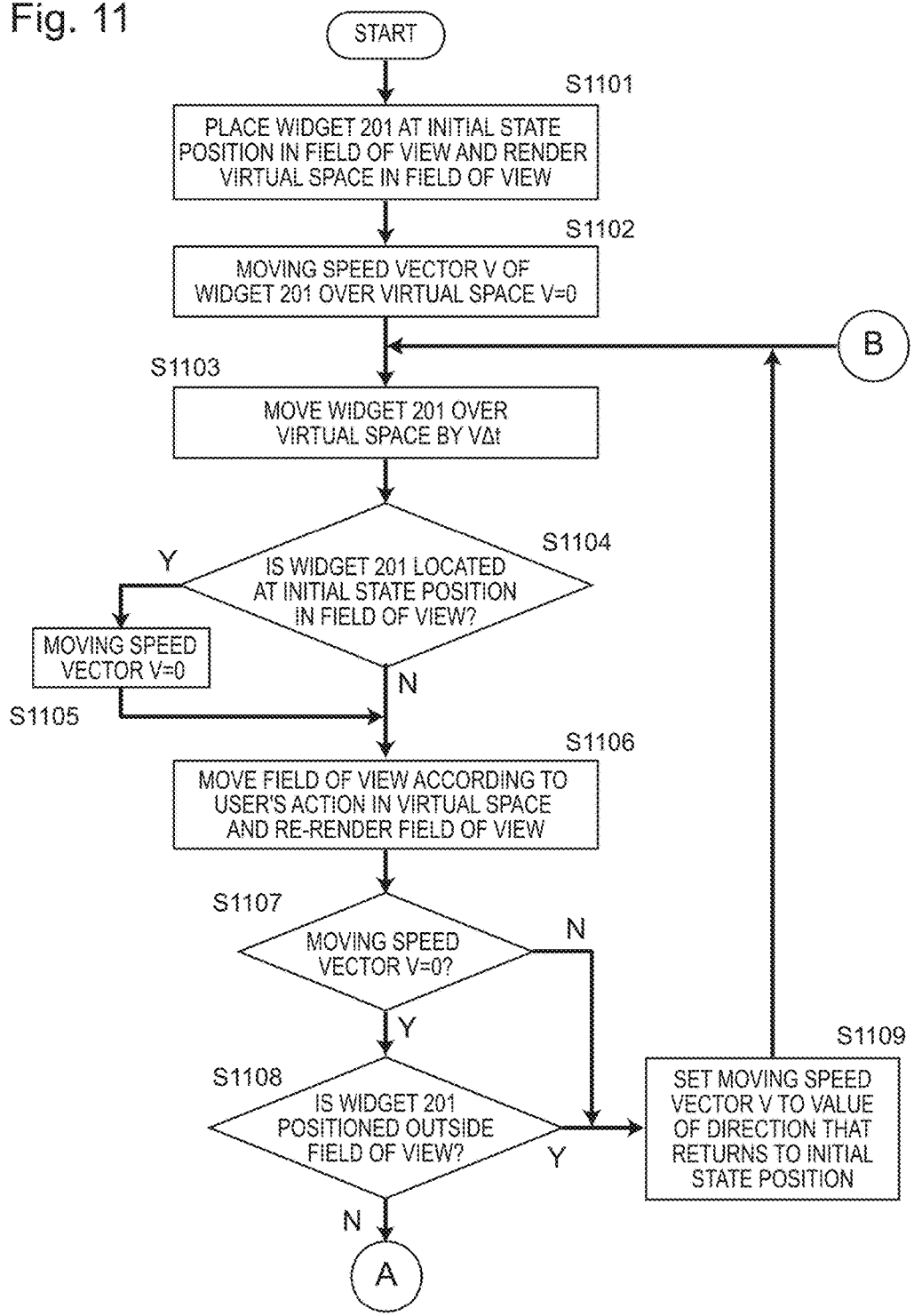
FIG. 11 is a diagram illustrating processing relating to movement in the horizontal direction (X direction) among the actions of the widget 201.
Figure 12:
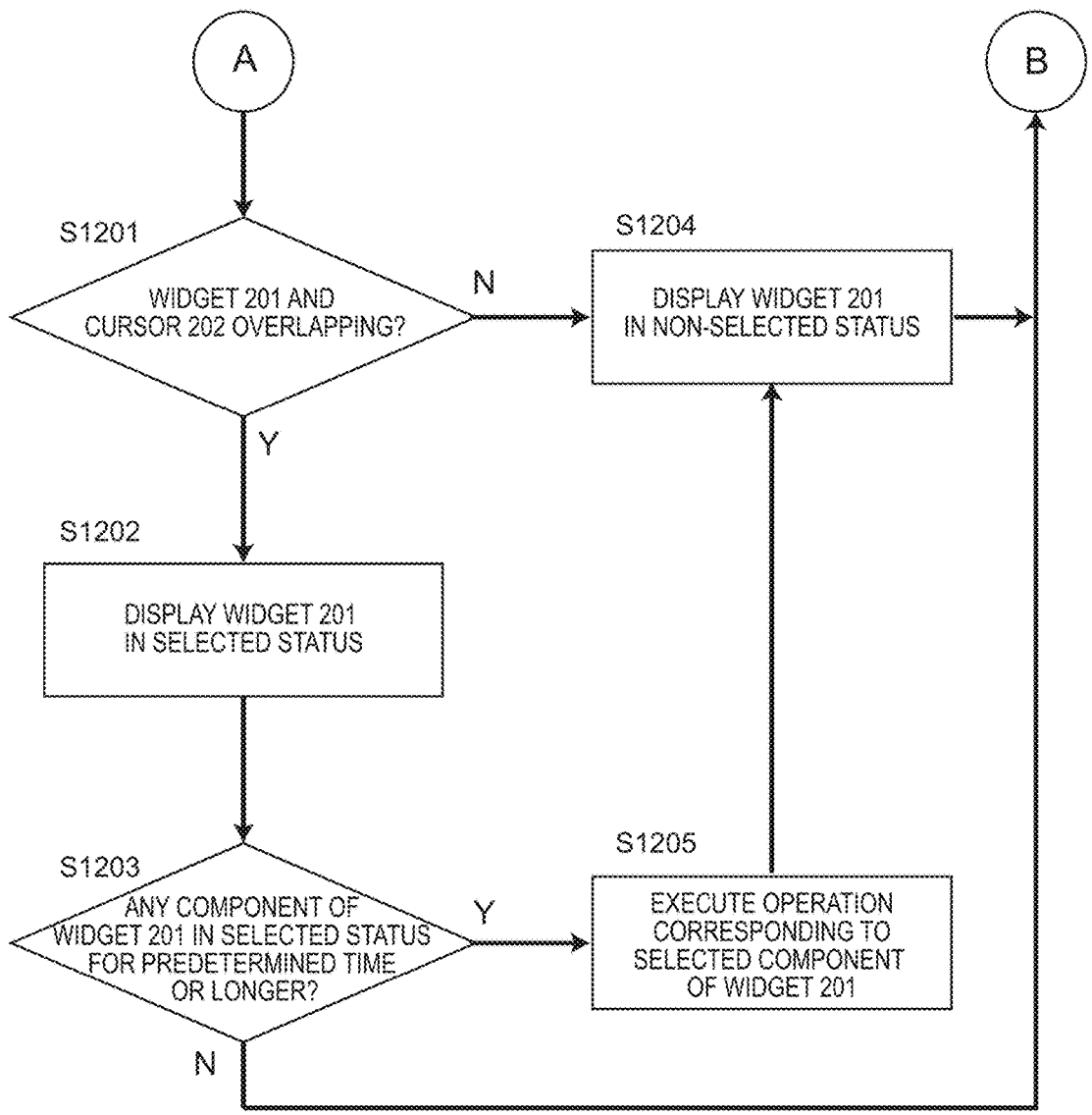
FIG. 12 is a diagram illustrating processing relating to selection of the widget 201.

FIGS. 11 and 12 show a flowchart illustrating processing that enables the actions of the widget 201 described thus far. In some embodiments, the flowchart only shows the basic processing and omits processing relating to movement in the Z-axis direction or processing for preventing the widget 201 from going off the virtual sphere 1001, for example.

FIG. 11 illustrates processing relating to movement of the field of view 204 and movement of the widget 201.

Steps S1101 and S1102 are initialization steps for display of the widget 201, where the widget 201 is placed at a position $(X_{vs0}, Y_{vs0}, Z_{vs0})$ in the virtual space that corresponds to the initial state position $(X_{fv0}, Y_{fv0})$ in the field of view, the entire field of view is rendered, and the moving speed vector V of the widget 201 over the virtual space is initialized to 0.

Step S1103 is a widget moving step to move the widget 201 in the virtual space at a moving speed vector V. Since the moving speed vector V is 0 in almost all the states including the initial state in this example, no action is performed in step S1103 when V=0. However, if the moving speed vector V is set to a value other than 0, the value is used to move the widget 201 in the virtual space by VΔt so as to return the widget 201 to the initial state position in the field of view as per the steps S1107 and S1108 described below.

Steps S1104 and S1105 are widget moving speed re-initialization steps to detect that the widget 201 has returned to the initial state position in the field of view and re-initialize the moving speed vector V to 0.

Step S1106 is a field-of-view moving step to move the field of view in the virtual space according to the user's action and render the field of view accordingly. The field-of-view moving step moves the point of gaze by performing control so that the field of view in the virtual space moves. However, if it is possible to move the point of gaze independently from movement of the field of view such as by detecting the movement of the eyeballs or using some kind of auxiliary input, processing for the point of gaze movement may be also carried out in the field-of-view moving step. Therefore, the portion of the field-of-view moving step that relates to movement of the point of gaze, whether based on movement of the field of view or eyeball movement, may also be called a point-of-gaze moving step.

In some embodiments, the field-of-view moving step is configured to detect the motion of the user's head measured by the head mounted display (HMD) and perform control so that the field of view in the virtual space moves using the detected attitude data.

Step S1107 is a step to determine whether the widget 201 is currently moving. If the widget 201 is currently moving, the flow proceeds to step S1109 because a new value of the moving speed vector V needs to be set in order to handle the movement of the field of view during the movement of the widget 201 and change in the position in the virtual space that corresponds to the initial state position in the field of view.

Step S1108 is a widget outside field-of-view determination step to determine whether the position of the widget 201 in the horizontal direction (X direction) within the field of view is outside the field of view. As mentioned earlier, the condition for determining that the widget 201 is positioned outside the field of view may be any of that part of the widget 201 is positioned outside the field of view, that half of the widget 201 is positioned outside the field of view, or that the entire widget 201 is positioned outside the field of view.

Step S1109 is a widget moving speed setting step to set a value for the moving speed vector V in order to return the widget 201 to the initial state position in the field of view. As previously mentioned, at step S1103, the moving speed vector V is used to move the widget 201 in the virtual space so that it returns to the initial state position in the field of view. To this end, the direction of moving speed vector V is the direction that connects between the current position of the widget 201 in the virtual space and the position in the virtual space corresponding to the initial state position in the current field of view. In order to make the widget 201 appear to be actually floating in the virtual space, the value to which the moving speed vector V is set can be determined so as not to exceed a certain value having a vector magnitude.

The steps up to S1109 are processing steps relating to the movement of the field of view 204 and movement of the widget 201.

Referring now to FIG. 12, processing steps relating to selection of the widget 201 will be described.

At step S1201, determination of whether the widget 201 and the cursor 202 overlap each other is performed. Since the cursor 202 is located at the point of gaze, it is virtually equivalent to determining whether or not the widget 201 is located at the position of the point of gaze.

If the widget 201 and the cursor 202 are determined to overlap each other at step S1201, display of the widget 201 is changed to selected status indication at step S1202. The selected status indication may be any of various forms, such as highlighting, change in color, or change to display in a different form. In some embodiments, buttons or the like as targets of operation may be expanded and displayed at this point in a similar manner to a dropdown list, a popup menu, or a context menu used in typical graphical user interfaces.

The steps S1201 and S1202 correspond to a widget selection step.

At step S1203, it is determined whether any component of the widget 201 has been in the selected status for a predetermined time or longer; and if it has been in the selected status for the predetermined time or longer, an operation corresponding to the selected component of the widget 201 is executed at step S1205, which is an input step. However, if any component of the widget 201 has not been in the selected status for a predetermined time or longer yet, the flow returns to step S1103.

At step S1204, the widget 201 is displayed in non-selected status if it is determined that the widget 201 and the cursor 202 do not overlap at step S1201 or when an operation corresponding to the widget 201 is performed at step S1205, after which the flow returns to step S1103.

Referring now to FIGS. 13 to 16, a system for displaying the widget 201 will be described. As previously mentioned, although descriptions relating to FIGS. 13 to 15 assume that the system uses a head mounted display (HMD) containing various kinds of sensors (e.g., an acceleration sensor and an angular velocity sensor) and is capable of measuring attitude data for the HMD, the present disclosure is also applicable to a system that displays a virtual space on a common display and moves the line of sight in the virtual space in response to inputs through a keyboard, mouse, or a joystick.

Figure 13:
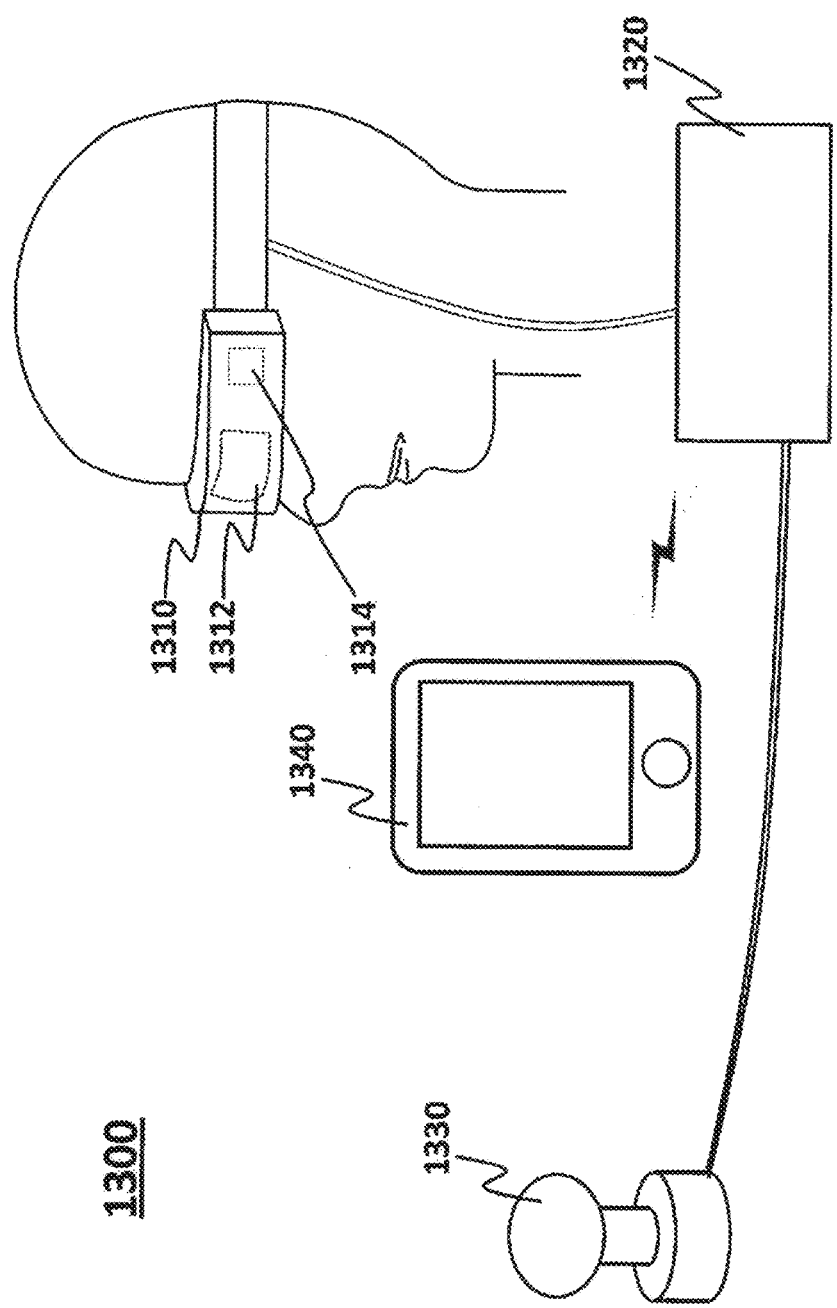
FIG. 13 is a diagram illustrating a system 1300 for displaying the widget 201.

FIG. 13 generally shows a system 1300 for displaying the widget 201.

As shown in FIG. 13, the system 1300 comprises a head mounted display (HMD) 1310, a control circuit unit 1320, a position tracking camera (position sensor) 1330, and an external controller 1340.

The head mounted display (HMD) 1310 comprises a display 1312 and a sensor 1314. The display 1312 is a non-transmissive display device configured to completely cover the user's field of view; the user can observe the screen displayed on the display 1312. When wearing the non-transmissive head mounted display (HMD) 1310, the user loses all of the field of view in the outside world, meaning a form of display in which the user is completely immersed in the virtual space displayed by an application run in the control circuit unit 1320.

The sensor 1314 contained in the head mounted display (HMD) 1310 is fixed in the vicinity of the display 1312. The sensor 1314 may comprise a geomagnetic sensor, an acceleration sensor, and/or a tilt (angular velocity or gyroscope) sensor, and via one or more of such sensors, various motions of the head mounted display (HMD) 1310 (display 1312)

worn on the user's head can be detected. An angular velocity sensor in particular can detect the angular velocity of the head mounted display (HMD) 1310 about the three axes over time in response to the motion of the head mounted display (HMD) 1310 as shown in FIG. 14 so that the temporal change in angle (tilt) about each axis can be determined.

Referring to FIG. 14, angle information data that can be detected by a tilt sensor will be described. As shown in the figure, X, Y, and Z coordinates are defined about the head of the user wearing the head mounted display (HMD). The axis of the vertical direction in which the user stands upright is defined as the Y-axis, the axis of the direction intersecting with the Y-axis and connecting between the center of the display 1312 and the user is defined as the Z-axis, and the axis of the direction orthogonal to the Y-axis and the Z-axis is defined as the X-axis. A tilt sensor detects the angles about the axes (i.e., tilts determined by the yaw angle indicating rotation about the Y-axis, the pitch angle indicating rotation about the X-axis, and the roll angle indicating rotation about the Z-axis), and according to their temporal change, a motion detecting unit 1610 determines angle (tilt) information data as field-of-view information.

Referring back to FIG. 13, the control circuit unit 1320 included in the system 1300 functions as a control circuit unit 1320 for immersing the user wearing the head mounted display (HMD) into a three-dimensional virtual space and allowing the user to perform operations based on the three-dimensional virtual space. As shown in FIG. 13, the control circuit unit 1320 may be implemented as hardware separate from the head mounted display (HMD) 1310. The hardware may be a computer such as a personal computer or a server computer connected over a network. More specifically, it may be any kind of computer that comprises a CPU, main memory, auxiliary storage, a transmission and reception unit, a display unit, and an input unit, which are interconnected by a bus.

In some embodiments, the control circuit unit 1320 may be provided inside the head mounted display (HMD) 1310 as an object operation apparatus. Here, the control circuit unit 1320 can implement all or only some of the functions of the object operation apparatus. When the control circuit unit 1320 implements only some of the functions, the remaining functions may be implemented on the head mounted display (HMD) 1310 side or a server computer (not shown) side over a network.

The position tracking camera (position sensor) 1330 of the system 1300 is communicatively coupled with the control circuit unit 1320 and has the function of tracking the position of the head mounted display (HMD) 1310. The position tracking camera (position sensor) 1330 is implemented using an infrared sensor or multiple optical cameras. By having the position tracking camera (position sensor) 1330 and detecting the position of the head mounted display (HMD) on the user's head, the system 1300 is able to precisely map and determine the virtual space positions of the virtual camera or the immersed user in a three-dimensional virtual space.

Figure 15:
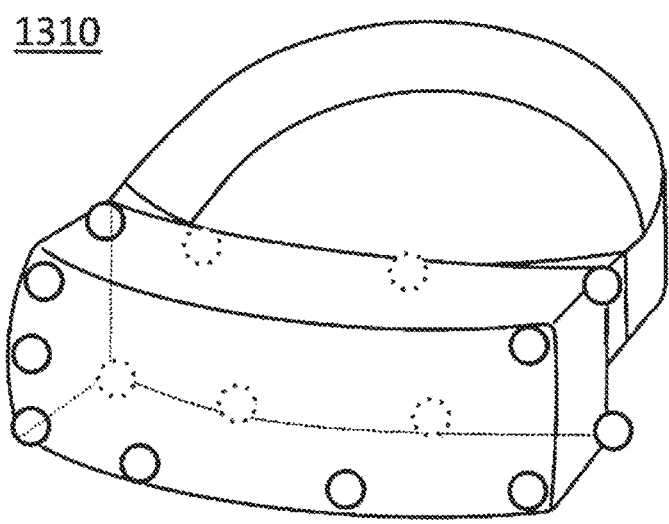
FIG. 15 is a diagram illustrating points provided on the head mounted display (HMD) 1310 which emit infrared for a position tracking camera (position sensor) 1330.

More specifically, as illustrated in FIG. 15 as an example, the position tracking camera (position sensor) 1330 detects the positions in the real space of multiple detection points, which are virtually set on the head mounted display (HMD) 1310 and detect infrared, over time in response to the user's motions. Then, based on the temporal change in the real space positions detected by the position tracking camera (position sensor) 1330, the temporal change in the angle about each axis associated with the motion of the head mounted display (HMD) 1310 can be determined.

Referring back to FIG. 13, the system 1300 includes the external controller 1340. The external controller 1340 may be a typical user terminal, which may be, but is not limited to, a smartphone as illustrated in the figure. It may be any kind of portable device terminal having a touch display, e.g., a PDA, tablet computer, game console, or notebook PC. That is, the external controller 1340 may be any kind of portable device terminal that comprises one or more of a CPU, main memory, auxiliary storage, a transmission and reception unit, a display unit, and an input unit which are interconnected by a bus. A user can perform various types of touch operation, including tap, swipe, and hold, on the touch display of the external controller 1340.

Figure 16:
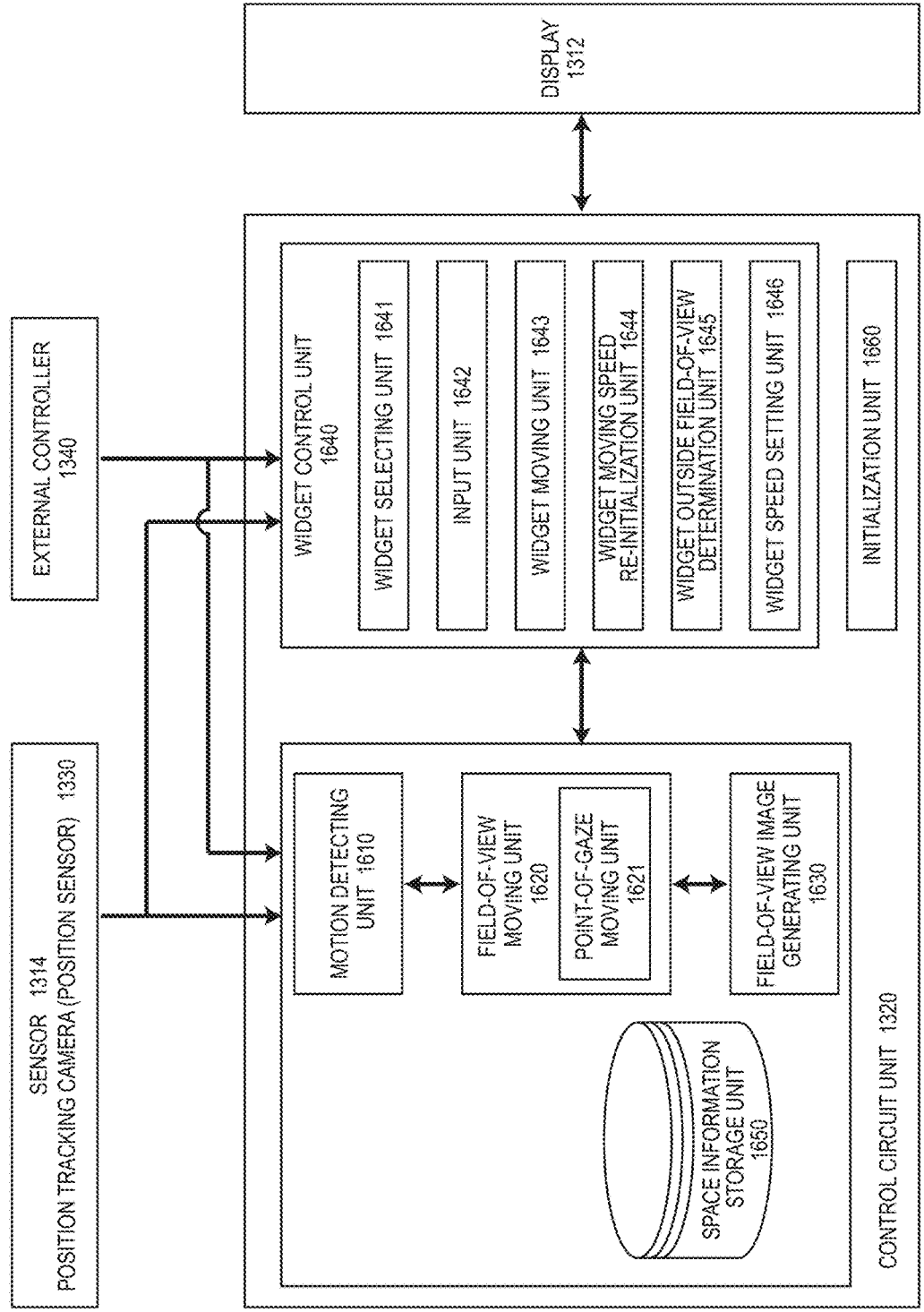
FIG. 16 is a diagram illustrating a configuration of the primary functions of components for displaying the widget 201.

The block diagram in FIG. 16 shows the configuration of the primary functions of components, including the control circuit unit 1320 as the central component, for implementing object manipulation in a three-dimensional virtual space according to some embodiments of the present disclosure. The control circuit unit 1320 may be responsible for accepting input from the sensor 1314/the position tracking camera (position sensor) 1330, and the external controller 1340, processing the input and providing output to the display 1312. The control circuit unit 1320 comprises a motion detecting unit 1610, a point-of-gaze moving unit 1621, a field-of-view image generating unit 1630, and a widget control unit 1640 among others, and processes various kinds of information.

The motion detecting unit 1610 measures motion data for the head mounted display (HMD) 1310 worn on the user's head based on input of motion information from the sensor 1314 and the position tracking camera (position sensor) 1330. The present disclosure determines angle information detected over time by the tilt sensor 1314 and position information detected over time by the position tracking camera (position sensor) 1330 among others.

The field-of-view moving unit 1620 determines the field of view information on the basis of three-dimensional virtual space information stored in the space information storage unit 1650, and detection information for the field-of-view direction of a virtual camera which is based on angle information detected by the tilt sensor 1314 and position information detected by the position sensor 1330. The point-of-gaze moving unit 1621 included in the field-of-view moving unit 1620 determines information on the point of gaze in the three-dimensional virtual space based on the field of view information. When it is possible to move the point of gaze independently from movement of the field of view such as by detecting eyeball movement or using some kind of auxiliary input, the point-of-gaze moving unit 1621 performs the associated processing as well.

In some embodiments, the field-of-view moving unit 1620 can be configured to perform control so that the head mounted display (HMD) uses the motion of the user's head measured by the sensor 1314 or the position tracking camera (position sensor) 1330 to move the field of view in the virtual space.

The field-of-view image generating unit 1630 generates a field-of-view image in accordance with the field of view information and the position of the widget 201 sent from the widget control unit 1640.

The widget control unit 1640 is responsible for the most part of the control illustrated in FIGS. 11 and 12. Specifically, the widget control unit 1640 comprises a widget selecting unit 1641, an input unit 1642, a widget moving unit 1643, a widget moving speed re-initialization unit 1644, a widget outside field-of-view determination unit 1645, and a widget speed setting unit 1646. The widget selecting unit 1641 determines whether the widget 201 and the cursor 202 overlap each other, and when the widget 201 and the cursor 202 are determined to overlap, the widget selecting unit 1641 conducts processing for changing the display of the widget 201 to the selected status indication. The input unit 1642 decides whether any component of the widget 201 has been in the selected status for a predetermined time or longer; and if any component of the widget 201 has been in the selected status for the predetermined time or longer, the input unit 1642 executes an operation corresponding to the component of the widget 201 being selected. The widget selecting unit 1641 and the input unit 1642 may accept input from the external controller 1340 and decide whether any component of the widget 201 has been selected or not according to the input. The widget moving unit 1643 conducts processing for moving the widget 201 at the moving speed vector V for the virtual space. The widget moving speed re-initialization unit 1644 detects that the widget 201 has returned to the initial state position in the field of view and performs processing for reinitializing the moving speed vector V to 0. The widget outside field-of-view determination unit 1645 performs processing for determining whether the position of the widget 201 in the horizontal direction (X direction) over the field of view is outside the field of view. The widget speed setting unit 1646 performs processing for setting the moving speed vector V to a certain value in order to return the widget 201 to the initial state position in the field of view.

The initialization unit 1660 may be responsible for performing processing relating to initialization.

The elements illustrated in FIG. 16 as functional blocks that perform different kinds of processing can be composed of CPUs, memories, and other kinds of integrated circuits in hardware implementation, or implemented as various programs and the like loaded into memory in software implementation. Those skilled in the art accordingly will appreciate that the functional blocks may be implemented with hardware, software, or a combination thereof.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of controlling a widget floating in an immersive virtual space, comprising:
    generating, based on stored immersive three-dimensional virtual space information, a position of the widget floating in the immersive virtual space, and a direction of a virtual camera in the immersive virtual space on the basis of a detected attitude and a detected position of a head mounted display, a field of view image in the virtual space regardless of an environment outside of the head mounted display to be displayed on a non-transmissive screen of the head mounted display;
    determining whether a point of gaze in the field of view image displayed on the non-transmissive screen is overlapped with the floating widget in the displayed field of view image, to allow an input to the floating widget in a condition in which the floating widget and the point of gaze overlap;
    determining whether at least a part of the floating widget is positioned outside the displayed field of view image regardless of a moving speed of the floating widget; and
    moving, when it is determined that the at least a part of the floating widget is positioned outside the displayed field of view image regardless of the moving speed of the floating widget, the floating widget so that the at least a part of the floating widget is positioned inside the displayed field of view image.

2. The method of claim 1, wherein
    determining whether at least a part of the floating widget is positioned outside the displayed field of view image comprises determining whether at least a part of the floating widget is positioned outside of the displayed field of view image in a horizontal direction;
    moving the floating widget comprises moving the floating widget along the horizontal direction so that the at least a part of the floating widget is in the displayed field of view image based on determining that the at least a part of the floating widget is positioned outside the displayed field of view image.

3. The method of claim 2, wherein
    moving the floating widget comprises moving the floating widget at a moving speed regardless of a moving speed of the displayed field of view image.

4. The method of claim 2, further comprising
    initializing to place the floating widget at a position in the virtual space that corresponds to an initial state position in the displayed field of view image and initializing the moving speed of the floating widget; and
    re-initializing the moving speed of the floating widget after moving the floating widget.

5. The method of claim 1, wherein
    moving the floating widget comprises moving the floating widget at a moving speed regardless of a moving speed of the displayed field of view image.

6. The method of claim 5, further comprising
    initializing to place the floating widget at a position in the virtual space that corresponds to an initial state position in the displayed field of view image and initializing the moving speed of the floating widget; and
    re-initializing the moving speed of the floating widget after moving the floating widget in the floating widget moving step.

7. The method of claim 1, wherein
    moving the floating widget comprises moving the floating widget at a moving speed such that the floating widget returns to the displayed field of view image.

8. The method of claim 1, further comprising
    initializing to place the floating widget at a position in the virtual space that corresponds to an initial state position in the displayed field of view image and initializing the moving speed of the floating widget; and
    re-initializing the moving speed of the floating widget after moving the floating widget in the widget moving step.

9. The method of claim 8, wherein
    re-initializing the moving speed of the floating widget comprises re-initializing the moving speed of the floating widget in a condition in which a position of the floating widget coincides with the initial state position, after moving the floating widget.

10. The method of claim 1, wherein
the point of gaze is fixed at a predetermined position in the displayed field of view image.

11. The method of claim 10, wherein
the point of gaze is displayed as a cursor in the displayed field of view image at least when the point of gaze comes into a vicinity of the floating widget.

12. The method of claim 1, wherein
the point of gaze is fixed at a center in the displayed field of view image.

13. An input method of inputting using a widget floating in an immersive virtual space, comprising:
generating, based on stored immersive three-dimensional virtual space information, a position of the widget floating in the immersive virtual space, and a direction of a virtual camera in the immersive virtual space on the basis of a detected attitude and a detected position of a head mounted display, a field of view image in the virtual space regardless of an environment outside of the head mounted display to be displayed on a non-transmissive screen of the head mounted display; and
determining whether a point of gaze in the field of view image displayed on the non-transmissive screen is overlapped with the floating widget in the displayed field of view image, to allow an input to the floating widget in a condition in which the point of gaze and the floating widget overlap;
initializing to place the floating widget at position in the virtual space that corresponds to an initial state position in the displayed field of view image, and initializing a moving speed vector V of the floating widget in the virtual space to 0;
moving the floating widget at the moving speed vector V in the virtual space;
re-initializing the moving speed vector V of the floating widget to 0, if the position of the floating widget in the displayed field of view image coincides with the initial state position in the displayed field of view image;
determining whether at least a part of the floating widget has become positioned outside the displayed field of view image regardless of the moving speed vector V of the floating widget; and
setting, when it is determined that the at least a part of the floating widget is positioned outside the displayed field of view image regardless of the moving speed vector V of the floating widget, the moving speed vector V of the floating widget to a value that makes the floating widget return to the initial state position in the displayed field of view image within the displayed field of view image in which the floating widget has been moved.

14. A non-transitory computer-readable medium with an executable program stored thereon, wherein the program instructs a processor to perform the following:
generating, based on stored immersive three-dimensional virtual space information, a position of a widget floating in the immersive virtual space, and a direction of a virtual camera in the immersive virtual space on the basis of a detected attitude and a detected position of a head mounted display, a field of view image in the virtual space regardless of an environment outside of the head mounted display to be displayed on a non-transmissive screen of the head mounted display;
determining whether a point of gaze in the field of view image displayed on the non-transmissive screen is overlapped with a floating widget in the displayed field of view image, to allow an input to the floating widget in a condition in which the floating widget and the point of gaze overlap;
determining whether at least a part of the floating widget is positioned outside the displayed field of view image regardless of a moving speed of the floating widget; and
moving, when it is determined that the at least a part of the floating widget is positioned outside the displayed field of view image regardless of the moving speed of the floating widget, the floating widget so that the at least a part of the floating widget is positioned inside the displayed field of view image.

15. A system of controlling a widget floating in an immersive virtual space, comprising one or more processors configured to execute operations comprising:
generating, based on stored immersive three-dimensional virtual space information, a position of a widget floating in the immersive virtual space, and a direction of a virtual camera in the immersive virtual space on the basis of a detected attitude and a detected position of a head mounted display, a field of view image in the virtual space regardless of an environment outside of the head mounted display to be displayed on a non-transmissive screen of the head mounted display;
determining whether a point of gaze in the field of view image displayed on the non-transmissive screen is overlapped with the floating widget in the displayed field of view image to allow an input to the floating widget in a condition in which the floating widget and the point of gaze overlap;
determining whether at least a part of the floating widget is positioned outside the displayed field of view image regardless of a moving speed of the floating widget; and
moving, when it is determined that the at least a part of the floating widget is positioned outside the displayed field of view image regardless of the moving speed of the floating widget, the floating widget so that the at least a part of the floating widget is positioned inside the displayed field of view image based on determining that the at least a part of the floating widget is positioned outside the displayed field of view image.

* * * * *